Patented Jan. 30, 1951

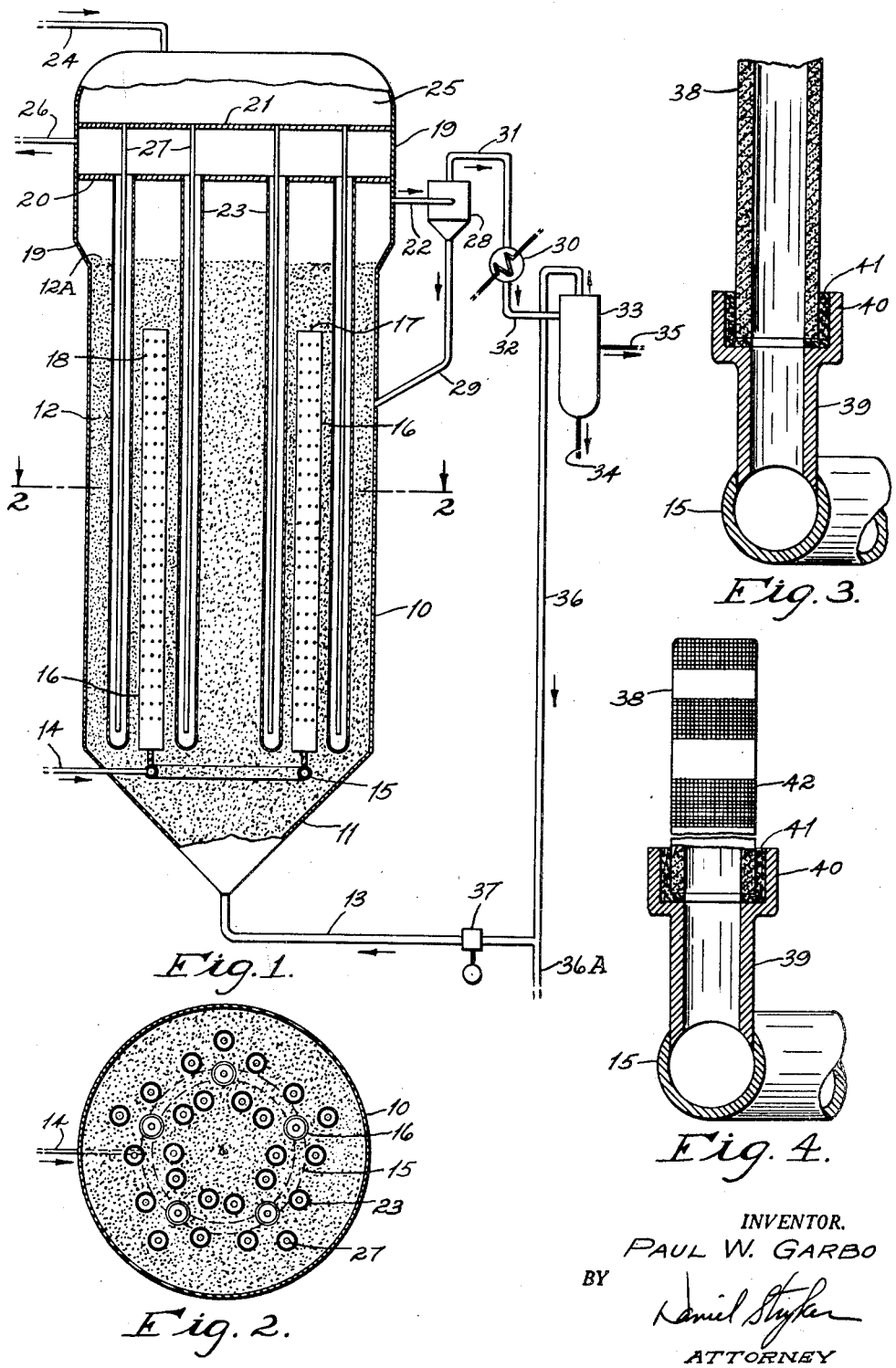

2,539,415

UNITED STATES PATENT OFFICE 2,539,415

PROCESS AND APPARATUS FOR THE SYNTHESIS OF HYDROCARBONS

Paul W. Garbo, Freeport, N. Y., assignor to Hydrocarbon Research, Inc., New York, N. Y., a corporation of New Jersey Application March 14, 1947, Serial No. 734,666

9 Claims. (Cl. 260—449.6)

The present invention relates to vapor phase catalytic reactions employing a powdered catalyst in a condition of fluidization and is more particularly concerned with vapor phase catalytic reactions involving a substantial thermal effect, either exothermic or endothermic, but requiring a careful temperature control and a predetermined, controlled distribution of reactants throughout the contact mass.

More particularly, the present invention involves the provision of a mass of catalyst in fine particle or powdered form held in a state of fluidization, preferably dense phase, by a gaseous stream passed upwardly therethrough while introducing a second gaseous stream comprising reactant substantially uniformly throughout the mass of fluidized catalyst, the gaseous reactant flowing as a segregated stream in a substantially vertical or upright direction through the fluidized mass and being discharged progressively as smaller streams into the fluidized mass at a plurality of vertically spaced points. Advantageously, the segregated reactant stream can be handled by means of suitable tubes or conduits extending upwardly or downwardly into the reaction zone, and provided with perforated, apertured, or porous walls through which the small side streams are released, in a predetermined pattern, into the fluidized catalyst mass.

Disposed within the fluidized catalyst mass is a suitable arrangement of heat transfer surfaces or tubes subjected internally to passage of a suitable heat transfer fluid capable of either extracting heat from the fluidized mass or supplying heat energy thereto in a controlled manner such as to maintain more or less predetermined temperature uniformity throughout the fluidized reaction mass. It is preferable that the heat transfer members or surfaces be regularly disposed in sufficient number throughout the reaction mass, so as to accomplish a very high degree of temperature uniformity.

The invention will hereinafter be described as applied to the synthesis of hydrocarbons by the catalytic reduction of carbon oxide with hydrogen, which reaction forms the preferred embodiment of the present invention and usually involves, as is known, contact at an elevated temperature between a gas comprising a mixture of carbon monoxide and hydrogen and synthesis catalyst, e. g., powdered iron.

The temperature employed depends on the catalyst selected as well as the particular type of products desired. As is also known, typical iron catalysts produce predominantly liquid hydrocarbon products at a temperature in the range of 600° F. to 650° F. and at an elevated pressure, say 200 to 250 lbs. per sq. in. gauge. The reaction is quite exothermic and accordingly requires special precautions to hold the operating temperature in the reaction zone at the specific, desired value.

It has been found that a mass of finely divided catalyst may be held in a condition of dense phase fluidization by recycling the normally gaseous reaction products recovered from the total reaction effluent, in such a manner that the gasiform recycle stream passes upwardly through the contact mass while the fresh feed reactants are introduced, preferably above the point of introduction of the recycle stream, through perforated or porous tubes which extend vertically in the reaction zone a substantial distance so that the fresh feed stream of reactant gases is supplied progressively throughout an extended vertical section or portion of the reaction zone. Any required number of inlet conduits for the fresh feed gases may be provided so that the introduction of these gases into the reaction zone and its intermingling with the gasiform recycle flow take place substantially instantaneously and uniformly throughout the fluidized catalyst mass.

The injection of the segregated reactant stream is generally accomplished laterally to upward flow of gases in the reactor, thereby to secure rapid admixture. In this way the reactant or reactants supplied are progressively dissipated by separation into a multiplicity of small streams, ejected from the tube or conduit at predetermined points and at controlled rates along the vertical length thereof.

The present invention has the important advantage of enabling the reactants to be supplied in a predetermined pattern of initial contact and distribution throughout the reaction zone without the usual disadvantages. In highly exothermic catalytic reactions such as the present, the introduction of the total feed to the lower portion of the reactor tends to result in localized overheating, such that even carefully designed cooling instrumentalities cannot provide an adequate thermal control. Moreover, as is obvious to those skilled in the art, the localized concentration of the catalytic reaction in a specific portion or portions of the reaction zone tends to result in undesired side reactions and in other objectionable effects which may be largely overcome in a reactor functioning more or less uniformly throughout the contact mass. While it has been heretofore proposed to employ spaced injection of the reactant gases throughout the vertical extent of the reaction bed, relatively complex and usually economically undesirable structures are required if the injected gases are to intermingle uniformly with the gasiform flow within the reactor. As a result, these prior proposals are generally compromises in which localized, insufficiently intermingled streams of the injected feed reactants will react at varying rates in the catalyst mass, creating conditions of internal non-uniformity in the reaction zone almost as bad as those sought to be overcome.

In accordance with the present invention, however, it has been discovered that where the catalyst is uniformly fluidized by a suitable gaseous stream, laterally injected gasiform streams of fresh reactant introduced into the highly ebullient and agitated catalyst powder become intermingled uniformly with the contents of the reaction zone substantially throughout the entire reaction zone with such rapidity that for all practical purposes intermingling may be considered instantaneous. Accordingly, the condition of the reaction mass at any horizontal section is, for all intents and purposes, uniform, so that the process may be carried out continuously under predetermined optimum conditions over long periods of time.

The invention has the further advantage of enabling the process to be carried out in unitary reactors of large capacity with all the benefits of large-scale operation and relatively high throughput. This contrasts with many prior proposals, of which I am aware, wherein fixed beds of catalyst must necessarily be arranged in relatively thin layers necessitating a multiplicity of complicated catalytic cells, tubes, or layers, each provided with its individual heat transfer surfaces and reactant supply and product recovery means. In short, the present invention permits operation economically with a large single mass of catalyst in a unitary reaction chamber in which are disposed only relatively simple instrumentalities for introducing feed gases and withdrawing reaction heat.

In order to describe the invention more in detail, reference is had to the figures of the appended drawings wherein Figure 1 represents more or less diagrammatically a sectional elevation taken centrally through a reactor embodying the principles of the present invention.

Figure 2 is a sectional view of the reactor of Figure 1, taken horizontally on the line 2—2 of Figure 1;

Figure 3 is a detailed sectional elevation showing one arrangement for mounting a porous supply tube; and Figure 4 is an elevation of an alternate type of porous tube.

Referring more particularly to Figure 1, the reactor therein disclosed comprises an outer cylindrical shell 10 having a funnel-shaped lower portion 11 and containing a mass of fluidized catalyst 12 in a state of dense phase fluidization. An inlet pipe 13 supplies a stream of recycle gas from a source, hereinafter to be described, to the lower extremity of the funnel-shaped section 11 at such a rate as to maintain the aforesaid condition of dense phase fluidization with the particles in a state of rapid vibration, overall analogous to a boiling liquid mass. Additional and independent means for introducing fresh feed reactants from any suitable source (not shown) comprises an inlet tube 14 which supplies an internal ring-shaped manifold 15 within the mass of catalyst. The manifold or distributing ring 15 is provided with a plurality of upstanding supply tubes 16 closed at their upper extremities 17 and provided with a predetermined pattern of spaced apertures 18 throughout their vertical surfaces.

The tubes 16 are preferably uniformly spaced as shown in Figure 2 so that the fresh feed gas flowing outwardly through the apertures 18 is rather well distributed through the mass of catalyst. In any embodiment, the precise number and disposition of tubes 16 will obviously depend on the degree of fluidization of the catalyst, the relative rates at which the gases are supplied both through pipe 13 and pipe 14, and numerous other factors. In any event, it is a simple matter, with reasonably well distributed inlet feed tubes 16 to operate so that the feed gas is for all intents and purposes instantaneously intermingled with the violently agitated catalyst and reaction products into which it is injected.

The upper portion of the reactor 10 may be enlarged as at 19 and provided with a pair of vertically spaced tube sheets 20 and 21, respectively. The space between the normal pseudo-liquid level 12A of the fluidized catalyst and the lower tube sheet 20 receives the effluent gasiform reaction products which are drawn off through outlet pipe 22 for further treatment and recovery as will hereinafter be described in more detail.

Temperature control within the reactor is effected by means of a plurality of bayonet-type cooling tubes 23 suspended from the tube sheet 20 and extending downwardly substantially coextensively with the supply tubes 16. Coolant is fed from any suitable source through inlet pipe 24 into a chamber 25 defined by the upper tube sheet 21 and the upper wall of the reactor. The coolant, such as Dowtherm (a mixture of diphenyl ether and diphenyl), water or mercury thence flows downwardly through a series of relatively small diameter tubes 27 extending interiorly and coaxially of the larger heat exchange tubes 23 and to a point spaced somewhat from the lower, closed extremity of the larger tubes. Obviously from the foregoing it will be seen that the supply of coolant rises within the tubes 23 and may be withdrawn from the chamber between the tube sheets 20 and 21 by means of outlet pipe 26. The temperature of the cooling surfaces may be controlled by circulating a coolant at a predetermined temperature and rate of feed, or by using the exothermic heat energy to vaporize the coolant at an operating pressure which will automatically maintain the cooling surfaces at the required temperature.

The effluent products of reaction withdrawn through pipe 22 may be supplied to a cyclone 28 or any other conventional form of separator adapted to remove entrained catalyst particles from the gasiform flow. The catalyst thus separated is returned by way of standpipe 29 to the main body of catalyst in the reactor. The separated gases are supplied to condenser 30 by means of pipe 31, the condensed product passing through pipe 32 to a separator 33. In the separator, water and liquid hydrocarbon layers are separated and recovered by way of outlet pipes 34 and 35, respectively.

Part of the normally gaseous reaction products pass overhead by way of pipe 36 to pump 37 from which they are fed into the aforementioned pipe 13. The remainder of the gaseous products flowing through pipe 36 are withdrawn at 36A and disposed of in any desired manner.

In operation, it will be apparent that the fresh feed gases are supplied to the fluidized catalyst in a predetermined pattern of injection controlled by the spacing and arrangement of the apertures 18 of the supply or distributing tubes 16. The fresh feed gases will normally comprise hydrogen and carbon monoxide in the molar ratio of about 2:1, respectively. Advantageously, contact time is such as to reduce the carbon monoxide content of the effluent gases to not less than about 1% on a molar basis. The normally gaseous products remaining after separation of the liquid reaction products, comprise unreacted carbon monoxide and hydrogen, usually some byproduct carbon dioxide and some light gaseous hydrocarbons such as methane. These are recycled to the bottom of the reactor in sufficient quantity to maintain, in combination with the flow of fresh feed gases, a good state of dense phase fluidization of the powdered catalyst. Advantageously, the volume of recycle gas is from about 1 to 3 times the volume of fresh feed addition; this is sufficient to maintain the fluidized reaction mass in extremely uniform condition throughout not only as to degree of fluidization but as to operating temperature. Thus, with the cooling surfaces well distributed throughout the highly agitated mass and with the reactant fresh feed injected progressively along the height of the reaction zone, temperatures may be readily maintained within about 1 or 2 degrees from the operating temperature selected. Moreover, it is possible to control the gaseous composition at any elevation in the reactor with the assurance that for all practical purposes it will be uniform throughout the horizontal cross-section at that elevation. Obviously, this means a degree of control of the reaction hitherto considered to be impossible.

While Figure 2 illustrates more specifically one arrangement of cooling and gas feed tubes, nevertheless the invention is not so limited and in its broadest aspect may embody any suitable alternative arrangement such that a good distribution of fresh reactants and cooling surfaces is effected.

In accordance with one specific example, a vessel is provided containing a mass of iron catalyst composed of metallic iron particles of 200 mesh and finer, at least 65% passing a 325 mesh screen. The catalyst contains about 1½% of sodium oxide ($Na_2O$) and about 2% alumina ($Al_2O_3$) and is conditioned in a conventional manner by prior treatment with a mixture of carbon monoxide and hydrogen until a condition of more or less settled catalytic activity results. The vessel is provided with cooling surfaces which maintain the catalyst at a temperature of 625° F. The reaction system is operated under 250 lbs. per sq. in. gauge. A fresh feed gas consisting of about 62% hydrogen and 33% carbon monoxide, the remainder being essentially nitrogen, methane and carbon dioxide, is supplied through a plurality of porous brass tubes immersed in the catalyst mass, the feed gas injection being substantially uniform from a point near the bottom of the contact mass to a point spaced about 3 feet from the upper pseudo-liquid level thereof. Fluidization is maintained by introduction into the bottom of the vessel of a flow of recycle gas consisting of the normally gaseous constituents of the effluent product. The recycle gas flow amounts to about twice the total flow of fresh feed gas on an equivalent volume basis. The fresh feed gas is preheated to about 600° F. while the recycle gas is preheated to about 580° F.

Under the foregoing conditions, the yield of liquid hydrocarbons ($C_3$ and higher) recovered amounts to about 85% on the basis of carbon monoxide consumed. Moreover, the catalyst mass does not vary more than 2° F. from the aforementioned operating temperature of 625° F., at any point in the vessel. Without any treatment, about 60% of the synthesized liquid hydrocarbons boil in the gasoline range. By deoxygenating the oxygenated hydrocarbons and polymerizing the unsaturated $C_3$ and $C_4$ hydrocarbons, the total gasoline recoverable from the process corresponds to approximately 75% of the converted carbon monoxide.

It is to be understood that the present invention has wide adaptability in respect to the possible embodiments which may be employed. Thus, for example, the reactant supply tubes or distributing members may take any suitable form adapted to inject the reactants in the progressive pattern desired. Figure 3 shows a porous tube 38 of the type employed in the foregoing example. Such porous tubes may be formed of a porous refractory material, such as Alundum or Carborundum, as well as metals prepared by powder metallurgy techniques. With this arrangement, means are required to couple the porous tube 38 to the manifold ring 15 and there is accordingly disclosed an upstanding branch pipe 39 which connects with the manifold 15 at its lower extremity and which at its upper extremity is provided with a bell socket 40 which receives the lower extremity of the porous tube 38. Any suitable sealing cement 41, such as water glass and zirconia, or Alundum cement, seals the juncture as shown.

In Figure 4 there is disclosed a porous tube 38 provided with spaced bands 42 representing impervious areas, for example, formed by coating tube 38 in these places with an impervious cement. This arrangement is of particular importance where the pressure drop in the supply or distributing tube becomes significant due to such things as relatively small tube diameter or other factor as a result of which it may be desirable to provide for relatively better egress of the gas at a point removed from the inlet end. In such case the impervious bands 42 are so arranged on tube 38 as to leave intermediate, permeable sections of successively increasing vertical extent in an upward direction. Obviously, many other equivalent arrangements will occur to those skilled in the art, such as a tube provided with perforations or apertures which increase in number and/or size in the direction away from the inlet extremity of the tube. To facilitate uniform injection of reactant gas into the fluidized mass, it is sometimes advantageous to supply the reactant gas to the porous or perforated tubes from both ends since this has an equalizing effect.

In addition to allowing for pressure drop within the tube, the pattern of feed injection may require some adjustment based on actual experience in operation, in order to maintain the desirable temperature uniformity referred to above.

While the foregoing description, for convenience in illustration, refers to a recycle stream embodying all of the normally gaseous reaction products, nevertheless the invention is not so limited but may employ, as a recycle stream, any selected portion or components thereof. Such a process may obviously be operated with conventional gas recovery systems (not shown) adapted to recover or separate the required fractions or constituents.

In place of the iron catalyst employed in the preferred process of hydrocarbon synthesis, any of the familiar catalysts, such as nickel, cobalt and ruthenium, may be employed in powdered form, whether supported or not, accompanied by any of the conventional activators or promoters. For example, the alkali metal or alkaline earth metal oxides, alumina and titania may be present in the catalyst.

Many other specific modifications and adaptations of the present invention will be obvious to those skilled in the art from a consideration of the foregoing exemplary description and it is therefore to be understood that the invention is not limited to any such details except as defined in the following claims.

I claim:

1. In an apparatus for catalytic vapor phase reactions wherein a reactant gas is contacted with a fluidized catalyst at an elevated temperature, a reaction vessel having a reaction zone adapted to enclose a fluidized mass of powdered catalyst, means adjacent the lower portion of the reaction vessel for passing a distributed flow of a gaseous stream through the catalyst in an upward direction for maintaining the catalyst in a state of fluidization, an upright conduit disposed within the reaction zone, said conduit being closed at one extremity and being operatively connected adjacent the opposite extremity with means for passing the reactant gas through said conduit, said conduit being a porous tube having predetermined, spaced portions of the surface thereof provided with a relatively impermeable coating, effective to seal the pores thereof, the intermediate portions of said surface being free from said coating such that the reactant gas passes therethrough for injection into the fluidized mass of catalyst and means located at the upper portion of the reaction vessel for withdrawing a gasiform stream containing the products of reaction.

2. In the synthesis of hydrocarbons by the exothermic reaction of carbon monoxide with hydrogen in contact with a hydrocarbon synthesis catalyst involving the passage of the reactants upwardly through a fluid phase mass of solid particle hydrocarbon synthesis catalyst in a reaction zone, maintained at an elevated temperature at which the said reaction proceeds, the improvement which comprises injecting into the lower portion of said reaction zone a gaseous fluidizing stream, causing said gaseous fluidizing stream to flow upwardly through the catalyst in contact therewith to maintain the catalyst particles in dense fluid phase condition with an upper, pseudo-liquid surface, passing a reactant stream in a path of flow extending upwardly and internally through the said fluid phase mass of catalyst out of contact and in indirect heat exchange relationship therewith, injecting the entire reactant stream into the dense fluid phase of catalyst particles along said upward path of flow in successive portions, the uppermost of which is disposed a substantial distance below said upper pseudo-liquid surface so that the injected portions of the reactant stream meet and intermingle with the upflowing fluidizing stream at a multiplicity of points along a substantial vertical section of the reaction zone within the fluid phase of catalyst, withdrawing the effluent gaseous products from the top portion of the reaction zone and recovering desired products of reaction therefrom.

3. In the synthesis of hydrocarbons by the exothermic reaction of carbon monoxide with hydrogen in contact with a hydrocarbon synthesis catalyst involving the passage of the reactants upwardly through a fluid phase mass of solid particle, hydrocarbon synthesis catalyst in a reaction zone, maintained at an elevated temperature at which the said reaction proceeds, the improvement which comprises injecting into the lower portion of said reaction zone a gaseous fluidizing stream, causing said gaseous fluidizing stream to flow upwardly through the catalyst in contact therewith to maintain the catalyst particles in dense fluid phase condition with an upper, pseudo-liquid surface, passing a reactant stream in a path of flow extending vertically and internally through the said fluid phase mass of catalyst out of contact and in indirect heat exchange relationship therewith, injecting the entire reactant stream into the dense fluid phase of catalyst particles along said vertical path of flow in successive portions, the uppermost of which is disposed a substantial distance below said upper pseudo-liquid surface so that the injected portions of the reactant stream meet and intermingle with the upflowing fluidizing stream at a multiplicity of points along a substantial vertical section of the reaction zone within the fluid phase of catalyst, withdrawing the effluent gaseous products from the top portion of the reaction zone and recovering desired products of reaction therefrom.

4. The method according to claim 3 wherein the gaseous fluidizing stream comprises normally gaseous effluent products previously recovered from the reaction zone.

5. In an apparatus for catalytic vapor phase reactions wherein a reactant gas is contacted with a fluidized catalyst at an elevated temperature, a reaction vessel having a reaction zone adapted to enclose a fluidized mass of powdered catalyst, means adjacent the lower portion of the reaction vessel for passing a distributed flow of a gaseous stream through the catalyst in an upward direction for maintaining the catalyst in a state of fluidization, an upright conduit disposed within the reaction zone, said conduit being closed at one extremity and being operatively connected adjacent the opposite extremity with means for passing the reactant gas through said conduit, said conduit being a porous tube, said porous tube varying in relative porosity along its length and increasing in relative porosity in a direction progressing from the point where said reactant gas passes thereinto, such that the reactant gas passes therethrough at predetermined rates, for injection into the fluidized mass of catalyst and means located at the upper portion of the reaction vessel for withdrawing a gasiform stream containing the products of reaction.

6. The apparatus according to claim 5 wherein a plurality of said upright conduits are disposed within the reaction zone in laterally spaced relationship.

7. The apparatus according to claim 5 wherein the upright conduit comprises a porous metal tube.

8. The apparatus according to claim 5 wherein said conduit is enclosed at its upper extremity and is connected adjacent its lower extremity with said means for passing the reactant gas therethrough.

9. The apparatus according to claim 5 wherein the reaction zone contains heat transfer surfaces disposed in spaced relationship to said upright conduit, and subject to regulated temperature control by an internal coolant.

PAUL W. GARBO.

REFERENCES CITED

The following references are of record in the file of this patent:

UNITED STATES PATENTS

| Number | Name | Date |
|---|---|---|
| 2,078,950 | Houdry et al. | May 4, 1937 |
| 2,320,562 | Bransky | June 1, 1943 |
| 2,386,846 | Dunham | Oct. 16, 1945 |
| 2,414,276 | Sensel | Jan. 14, 1947 |
| 2,417,393 | Evans | Mar. 11, 1947 |
| 2,453,740 | Becker | Nov. 16, 1948 |